United States Patent [19]
Balleza et al.

[11] Patent Number: 5,501,140
[45] Date of Patent: Mar. 26, 1996

[54] DOUBLE-PRESS SYSTEMS FOR A PRODUCTION LINE FOR TORTILLAS AND THE LIKE

[75] Inventors: Silvestre G. Balleza, Atizapan de Zaragoza; Vincente L. Perez, Ecatepec, both of Mexico

[73] Assignee: Central Impulsora S.A. de C.V., Mexico

[21] Appl. No.: 405,943

[22] Filed: Mar. 17, 1995

Related U.S. Application Data

[63] Continuation-in-part of Ser. No. 139,712, Oct. 22, 1993, abandoned.

[51] Int. Cl.⁶ .............. A21C 9/08; A21C 11/00; A23P 1/00; A47J 37/00
[52] U.S. Cl. .............. 99/349; 99/353; 99/355; 99/386; 99/443 C; 99/470; 100/93 P; 100/151; 425/167; 425/364 R; 425/403.1
[58] Field of Search .............. 99/334–337, 372, 99/373, 377, 379, 386, 443 R, 443 C, 423, 427, 450.1, 477, 470; 100/45, 151, 49, 153, 93 P, 156, 222, 178, 144; 198/341, 810, 502.3, 832.1; 425/166, 167, 383, 367, 403.1, 364 R; 426/502, 517

[56] References Cited

U.S. PATENT DOCUMENTS

| | | |
|---|---|---|
| 2,750,899 | 6/1956 | Marasso . |
| 3,972,672 | 8/1976 | Castro ..................... 425/367 |
| 4,100,848 | 7/1978 | Grissinger . |
| 4,241,648 | 12/1980 | Longenecker .............. 99/355 |
| 4,668,524 | 5/1987 | Kirkpatrick . |
| 4,683,813 | 8/1987 | Schultz ................... 100/93 P |
| 4,724,755 | 2/1988 | Escamilla .............. 99/443 C |
| 4,750,413 | 6/1988 | Voegtlin . |
| 4,817,511 | 4/1989 | Huang et al. ............. 99/349 |
| 4,838,153 | 6/1989 | Escamilla et al. .......... 99/353 |
| 4,905,581 | 3/1990 | Kirkpatrick .............. 100/45 |
| 4,938,126 | 7/1990 | Rubio et al. ............. 100/151 |
| 5,095,813 | 3/1992 | Escamilla et al. .......... 99/349 |
| 5,231,919 | 8/1993 | Lawrence et al. ........ 425/364 R |
| 5,375,509 | 12/1994 | Taylor et al. ............ 99/353 |
| 5,388,503 | 2/1995 | Buerkle .................. 100/151 |

FOREIGN PATENT DOCUMENTS 1217680A  12/1983  U.S.S.R. .

*Primary Examiner*—Timothy F. Simone
*Attorney, Agent, or Firm*—Harold E. Meier

[57] ABSTRACT

An apparatus for producing continuous tortillas which includes a double-press system with three conveyors. The two presses are arranged in series to eliminate production gaps as the tortillas proceed into the oven. The structure of the second press is positioned higher than the structure of the first press so that tortillas formed from the second press can be deposited on the intermediate conveyor with tortillas formed from the first press, thereby providing a continuous supply of tortillas to the oven.

16 Claims, 3 Drawing Sheets

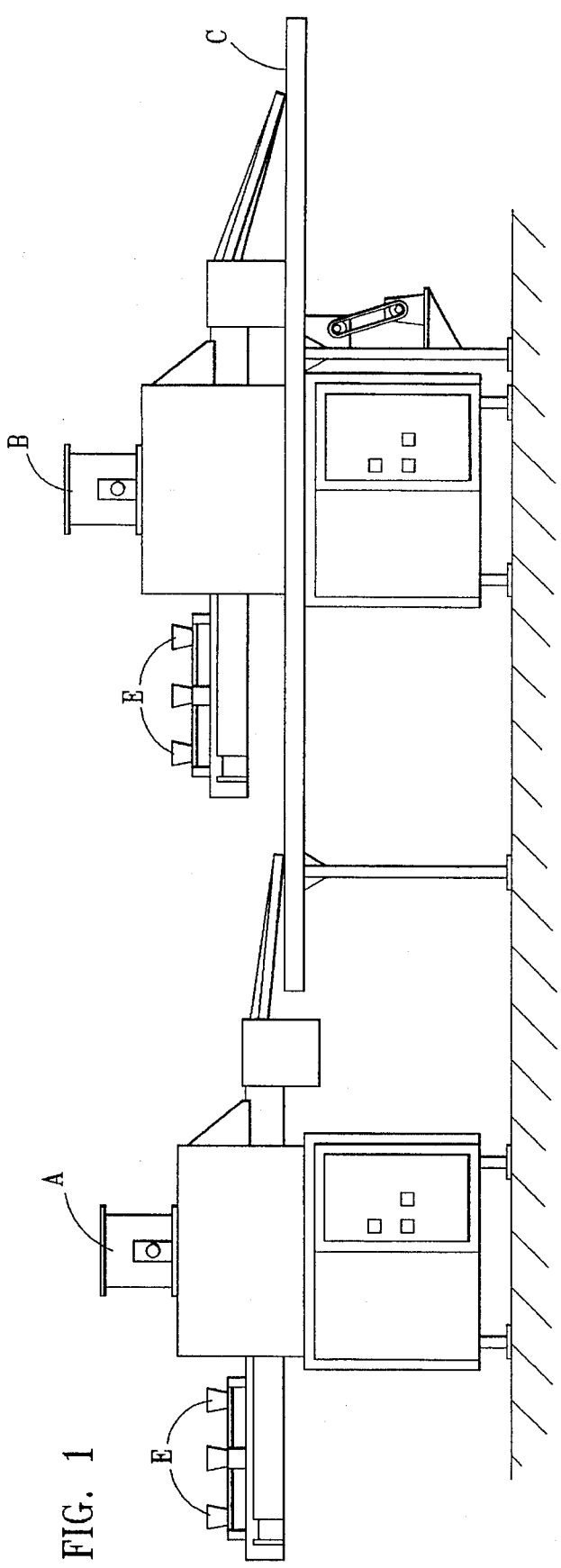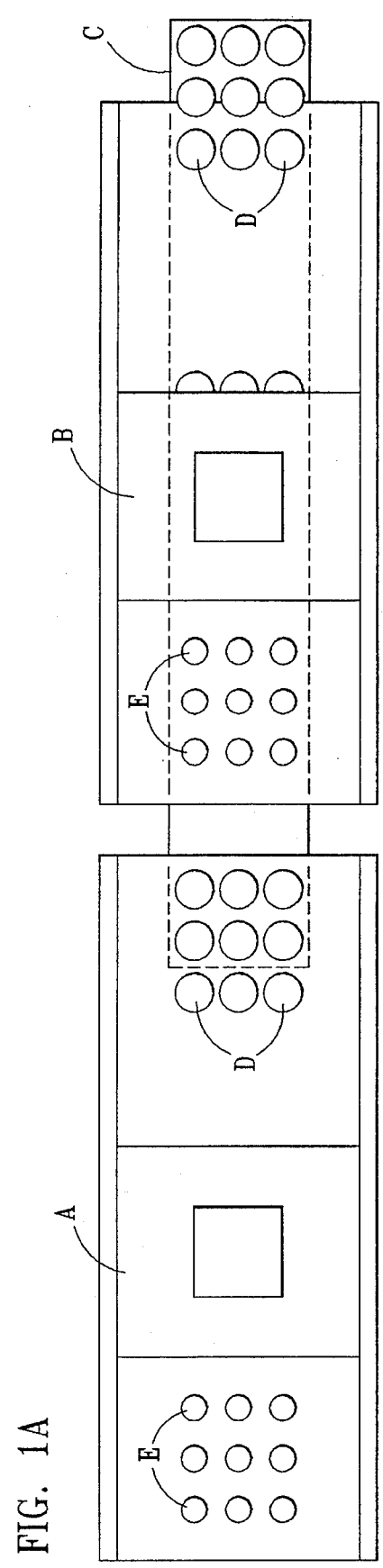

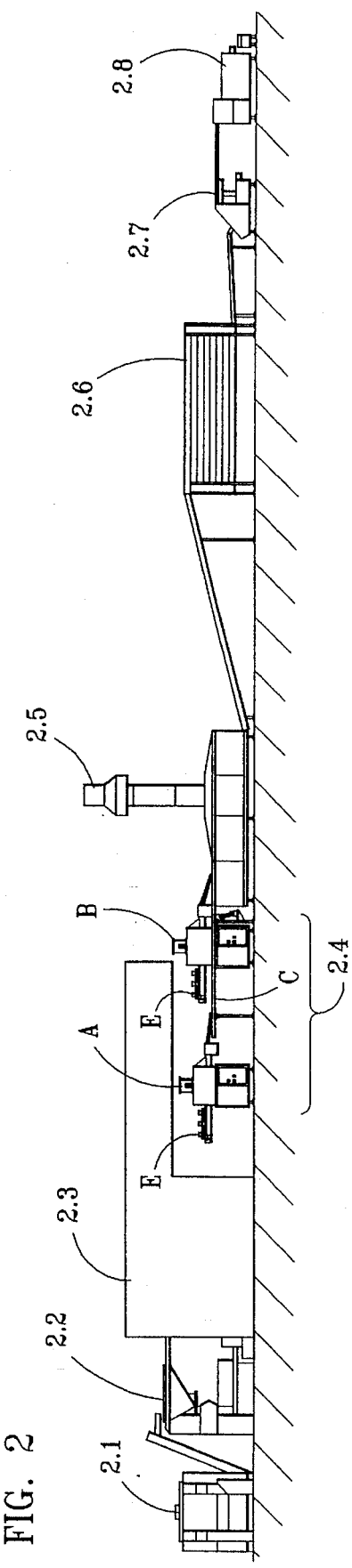
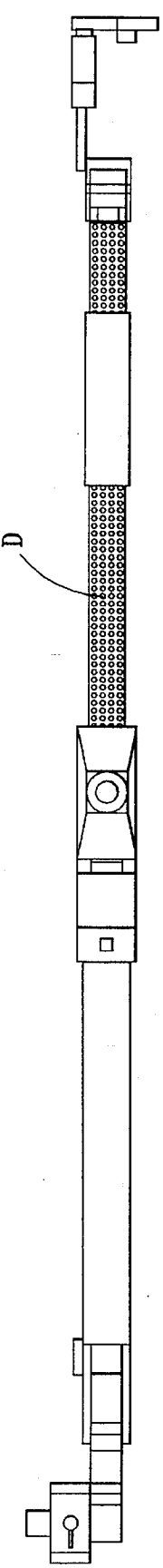
FIG. 2
FIG. 2A

DOUBLE-PRESS SYSTEMS FOR A PRODUCTION LINE FOR TORTILLAS AND THE LIKE

RELATED APPLICATIONS

This application is a continuation-in-part of prior application Ser. No. 08/139,712, filed Oct. 22, 1993, and abandoned, which is based on Mexican Patent application No. 926,103 filed Oct. 23, 1992.

TECHNICAL FIELD

The invention relates to the pressing of tortillas by a double-press system with an intermediate continuous moving conveyor to eliminate production gaps as the tortillas proceed into the oven.

BACKGROUND OF THE INVENTION

At present, the production lines for flour tortillas use only one press. Since the movement in delivering the tortillas from the press to the oven is cyclic, and since this movement should be continuous. The present production line utilizes only one press which results in gaps between each group of shaped tortillas, and thus the capacity of the line is not being suitably utilized.

SUMMARY OF THE INVENTION

The present invention addresses the foregoing problem. In the present invention, instead of a single press, two presses are placed in series along a continuous moving conveyor. In this way, the production obtained from the line is doubled without having to install a separate, complete production line. Furthermore, the arrangement of presses in series utilizes the capacity of the machines more efficiently. This makes the equipment more profitable since the production costs decline in proportion to the reduction of space occupied by two single-press lines.

The present invention relates to a production line for flour tortillas. The production line has a mixer for mixing the flour into dough. From the mixer the dough is conveyed to a shaper for shaping the mixed dough into separate units. A positioner receives the dough for further processing. A set of conduits transport the dough from the positioner to a first and second conveyor. The first conveyor receives a portion of the dough units and conveys this dough into a first press wherein the dough is pressed into a flat tortilia. Likewise, the second conveyor receives a second portion of the dough units and conveys this dough into a second press wherein the dough is pressed into a flat tortilla.

The first and second conveyors are synchronized with a third conveyor so that a continuous array of tortillas are supplied to the third conveyor. The third conveyor is positioned below the first and second conveyors and receives pressed tortillas from the synchronized first and second conveyors. The third conveyors transports the continuous array of tortillas to an oven for cooking. The cooked tortillas continue along the production line to a cooler. After the tortillas are cooled, they are transported to a piler which stacks and counts the tortillas. Finally, the stacked tortillas are packaged by a bagger.

BRIEF DESCRIPTION OF THE DRAWINGS

A more complete understanding of the invention may be had by reference to the following detailed description when taken in conjunction with the accompanying Drawings, in which:

FIG. 1 and FIG. 1A are the top and side views of the double-press system in accordance with the present invention;

FIG. 2 and FIG. 2A are the top and side views of the complete production line with the double-press system showing the arrangement of the tortillas.

DETAILED DESCRIPTION OF THE DRAWINGS

Referring to FIG. 1, the present system is made up of two presses (A and B) in series with each other and each having individual conveyor belts and a continuous moving conveyor (C) onto which the tortillas (D) are delivered in a synchronized manner. On the other hand, press (B) is very similar to press (A), except that its structure is higher so that the conveyor (C) passes under the press (B).

Figure 3:
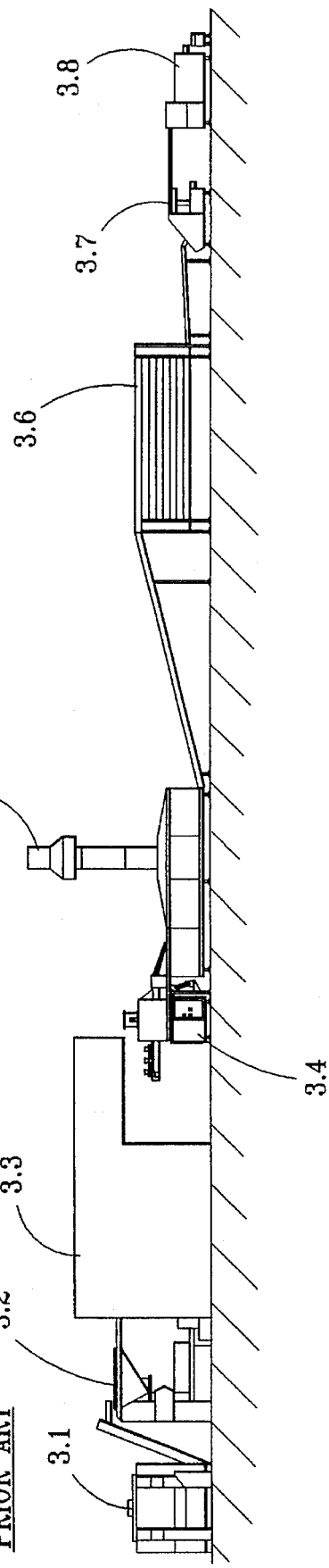
FIG. 3 and FIG. 3A are the top and side views of the complete production line with one press (prior art), showing the arrangement of the tortillas.
Figure 3A:
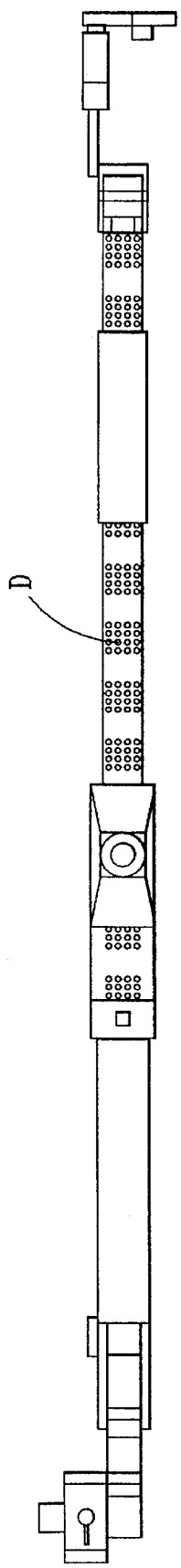

Referring now to FIGS. 2, 2A, 3, and 3A, FIGS. 2 and 2A illustrate the present invention and FIGS. 3 and 3A represent the prior art production lines. FIGS. 2, 2A, 3 and 3A show that both production lines have a mixer (2.1 and 3.1), a divider/ball shaper (2.2 and 3.2), a positioner (2.3 and 3.3), a pressing system (2.4 and 3.4), an oven (2.5 and 3.5), a cooler (2.6 and 3.6), a counter-piling device (2.7 and 3.7), and a bagger (2.8 and 3.6); however, if the arrangement of the tortillas (D) is noted, one can see that in a single-press line, very large gaps are left between each group of tortillas (D), which results in a production equal to half the capacity of the double-press line.

The production line for tortillas that include the double-press system operates in the following manner: the flour is prepared in the mixer (2.1), from which it emerges in the form of dough and moves toward a divider/ball shaper (2.2), where the dough is divided into small portions, which after being shaped into balls, passes to a positioner (2.3), from which the dough will fall through some conduits (E) to the pressing system (2.4), which operates in the following manner: the little balls of dough fall onto resting conveyor belts of the presses (A and B); subsequently, the belts will move, placing the little balls of dough beneath the pressing plate which will form the tortillas upon pressing the little balls of dough; while the pressing takes place, the conveyors of presses A and B remain motionless, and after the tortillas have been shaped, the conveyors, which have been synchronized, continue to move forward in such a manner that the tortillas will be deposited on a third intermediate conveyor (C), which in contrast to the press conveyors, moves continuously just as the rest of the line equipment.

The delivery of the tortillas is carried out in the following manner: the conveyor for press (A) delivers a group of tortillas onto the conveyor (C); after the delivery has been completed, the conveyor for press A and press (A) are motionless and the conveyor (C) which is synchronized with the conveyors of presses (A) and (B) will continue to move in such a manner that a space will be formed and when the conveyor (C) gets to the press (B), a group of tortillas from press (B) will fill the space. In this way, continuity of production is attained. As shown in FIG. 1, the structure of the second press (B) is positioned higher than the structure of the first press (A) so that tortillas formed from the second press (B) can be deposited on the intermediate conveyor (C) with tortillas formed from the first press (A), thereby providing a continuous supply of tortillas to the oven. From the conveyor (C), the tortillas pass to an oven (2.5), where they are cooked; then they pass to a cooler (2.6) and finally, they are stacked and counted in a piling device (2.7) and are packed by the bagger (2.8).

This description is not intended to limit the scope of the invention to the particular form set forth, but is intended to cover such alternatives, modifications, and equivalents as may be included within the scope and spirit of the invention as defined in the appended claims.

We claim:

1. A production line for tortillas prepared from flour comprising:

a first conveyor for receiving first units of dough;

a first press receiving the first units of dough from the first conveyor for pressing the first units of dough into tortillas;

a second conveyor for receiving second units of dough;

a second press connected in series with the first press for receiving the second units of dough from the second conveyor and for pressing the second units of dough into tortillas;

a third continuous conveyor positioned below said first conveyor and said second conveyor for sequentially receiving tortillas directly from said first conveyor and said second conveyor; and means for synchronizing the first and second conveyors with the third conveyor providing a continuous array of pressed tortillas.

2. The production line for flour tortillas of claim 1, further comprising a mixer for mixing the flour into the dough to be received by the first and second conveyors.

3. The production line for flour tortillas of claim 2, further comprising a shaper for shaping the mixed dough into units to be received by the first and second conveyors.

4. The production line for flour tortillas of claim 3, further comprising a positioner for transporting the mixed, shaped units of dough to be received by the first and second conveyors for further processing.

5. The production line for flour tortillas of claim 4, further comprising a plurality of conduits for receiving the units of mixed, shaped dough from the positioner.

6. The production line for flour tortillas of claim 1, further comprising an oven for receiving and cooking the tortillas, wherein the oven receives the dough from the third conveyor.

7. The production line for flour tortillas of claim 6, further comprising a cooler for cooling the tortillas received from the oven.

8. The production line for flour tortillas of claim 7, further comprising a piler for stacking and counting the cooled tortillas.

9. The production line for flour tortillas of claim 8, further comprising a bagger for packaging the tortillas received from the piler.

10. A production line for tortillas prepared from flour comprising:

a shaper for shaping dough into units;

a positioner for transporting the shaped dough units for further processing;

a first conveyor for receiving first units of dough from the positioner;

a first press receiving the first units of dough from the first conveyor for pressing the first units of dough into tortillas;

a second conveyor for receiving second units of dough from the positioner;

a second press receiving the second units of dough from the second conveyor for pressing the second units of dough into tortillas;

a third continuous conveyor positioned below said first conveyor and said second conveyor for sequentially receiving tortillas directly from said first conveyor and said second conveyor;

means for synchronizing the first and second conveyors with the third conveyor to provide a continuous array of pressed tortillas; and an oven for receiving and cooking the tortillas received from the third conveyor.

11. The production line for flour tortillas of claim 10, further comprising a mixer for mixing flour into dough to be received by the shaper.

12. The production line for flour tortillas of claim 10, further comprising a plurality of conduits for receiving the units of shaped dough from the positioner.

13. The production line for flour tortillas of claim 10, further comprising a cooler for cooling the tortillas received from the oven.

14. The production line for flour tortillas of claim 13, further comprising a piler for stacking and counting the cooled tortillas.

15. The production line for flour tortillas of claim 14, further comprising a bagger for packaging the cooled tortillas received from the piler.

16. A production line for tortillas prepared from flour comprising:

a mixer for mixing the flour into dough;

a shaper for shaping the mixed dough into units;

a positioner for transporting the mixed, shaped units of dough for further processing;

a plurality of conduits for transporting the units received from the positioner;

a first conveyor for receiving first units of dough from the plurality of conduits;

a first press receiving the first units of dough from the first conveyor for pressing the first units of dough into tortillas;

a second conveyor for receiving second units of dough from the plurality of conduits;

a second press receiving the second units of dough from the second conveyor for pressing the second units of dough into tortillas;

a third continuous conveyor positioned below said first conveyor and said second conveyor for sequentially receiving tortillas directly from said first conveyor and said second conveyor;

means for synchronizing the first and second conveyors with the third conveyor to provide a continuous array of pressed tortillas;

an oven for receiving the tortillas from the third conveyor and for cooking the tortillas;

a cooler for cooling the tortillas received from the oven;

a piler for stacking and counting the tortillas received from the cooler; and a bagger for packaging the tortillas received from the piler.

\* \* \* \* \*